Nov. 10, 1936.                A. THOMPSON                2,060,266
              BODY AND FENDER FINISHING MACHINE
                      Filed May 4, 1935            2 Sheets-Sheet 1

Inventor
Anders Thompson
By Charles L. Reynolds
Attorney

Nov. 10, 1936.  A. THOMPSON  2,060,266
BODY AND FENDER FINISHING MACHINE
Filed May 4, 1935  2 Sheets-Sheet 2

Inventor
Anders Thompson
By Charles L. Reynolds
Attorney

Patented Nov. 10, 1936

2,060,266

UNITED STATES PATENT OFFICE 2,060,266

BODY AND FENDER FINISHING MACHINE

Anders Thompson, Seattle, Wash.

Application May 4, 1935, Serial No. 19,847

12 Claims. (Cl. 51—170)

My invention relates to the art of metal finishing, and more particularly to a machine for finishing bodies and fenders of automobiles.

In order to obtain a durable coating of paint on automobiles it is essential that a clean smooth surface be produced upon which to apply the paint. Particularly after automobile parts, for example fenders, have been bent accidentally, it is difficult to straighten the curved surfaces with sufficient accuracy to obtain a smooth painting surface. Furthermore, parts so deformed have either had part of the paint knocked off in the accident, or the bending of the parts has caused the paint to crack and chip off. It is further necessary, therefore, before repainting the straightened parts, to remove all the old paint down to a clean, bright metal surface.

Heretofore it has required an excessive amount of hand scraping and brushing to get off the old paint and to burnish the metal surface sufficiently to receive new paint. Even by such treatment, however, it has been impossible to remove slight surface irregularities which show up when the paint has been applied, emphasizing the fact that the part has been repaired and straightened.

It is a principal purpose of my invention, therefore, to provide an easily portable machine which can be held in the hands and applied directly to a straightened part of an automobile, whether such straightening results in a flat or curved surface, and which machine will thoroughly and quickly remove all the old paint still adhering to the part, and in addition will take off any slight projections, reducing the entire part to an even and continuous surface of clean metal, ready to receive paint.

It is a further object to provide a machine which can be adjusted to conform to the contours of differently curved surfaces, whether such surfaces be concave or convex. The machine may be adjusted to penetrate down into concave surfaces, or on the other hand, to extend over convex surfaces, conforming to the curvature thereof.

Another object of my invention is to provide a machine which will evenly finish surfaces of slight curvature without any adjustment, and which will yield to conform to the surface of work operated upon which is not entirely even but which may be interrupted by small beads, ridges, or projections, or which may have slight rises or depressions therein. In addition my machine will finish surfaces of progressively changing contour without requiring any adjustment, unless the difference in degree of the extreme contours is excessive.

It is also an object to provide mechanism enabling the operator to adjust the machine quickly to finish surfaces of different contours without stopping the machine.

Still another object of my invention is to provide a machine which is simple in construction, and one which is light and compact, so that it may be moved about readily by the operator, and can be employed to finish surfaces which are not readily accessible for hand finishing or for application thereto of conventional machines.

A further object is to eliminate any chattering and jumping of the belt which may result from passage of the thickened portion at the joint over hard surfaced pulleys and rigid presser plates, or from other causes, by allowing only resilient shock absorbing means to carry and contact the belt.

Other objects, and more particularly those arising from the unique features of my machine, will be evident from a study of the description following.

My invention consists of the new machine, hereinafter described in the specification, illustrated in the drawings, and defined in the appended claims, and more particularly in the novel type of backing plate provided and the supporting and controlling means therefor.

The drawings accompanying this specification show one type of mechanism which may be employed to accomplish the above described objects, but are merely illustrative and the form and details of the mechanism are susceptible to modification for accomplishing the desired result.

The principal problem arising in designing a machine of this kind is to provide mechanism which will constitute a backing for an abrasive belt having sufficient resistance to press the abrasive belt firmly against the work, but which backing, on the other hand, is sufficiently resilient to yieldingly press the abrasive belt contiguously against a considerable area of a surface which is not absolutely plane.

Figure 2:
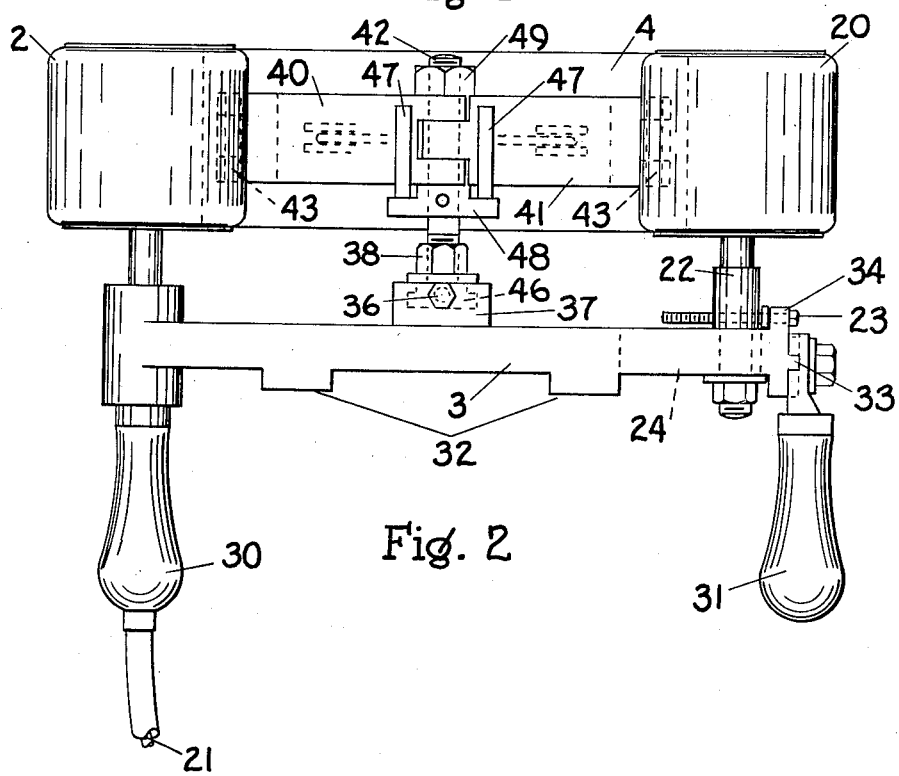
Figure 2 is a top plan view.
Figure 3:
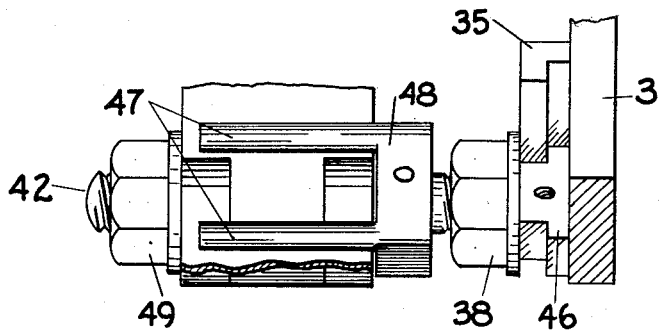
Figure 3 is a top perspective view, parts of which are in section, showing a detail of the device.

The machine may comprise an abrasive belt 1 looped about pulleys 2 and 20, which pulleys are carried by a frame 3. Any suitable drive means may be employed to rotate the pulleys, whereby the abrasive belt is moved over the work. Such drive means are illustrated by the flexible shaft 21 driving the pulley 2. If desired, however, a motor may be mounted on the bosses 32 and the pulley 2 may be rotated by a worm and pinion or any other suitable drive. Upon the frame 3 are mounted handles 30 and 31, which may be grasped by the operator to move the machine about over the work. If desired, the handle 31 may be swiveled to assume either the laterally projecting position shown in Figure 2, or it may be swung to project vertically upward from the frame 3, being held in either position desired by suitable holding means, such as a lug and cooperating notch 33. Between the pulleys 2 and 20, which are preferably rubber faced, is located a resilient backing plate 4 which engages the inner side of the abrasive belt 1. This plate is preferably of spring steel or similar material of yieldable character. Thus the plate 4 and the rubber faced pulleys 2 and 20, all taken together, serve as a discontinuous resilient backing means for the abrasive belt. Such an endless belt often has a thickened portion constituting a bump where the belt ends have been joined together. Where pulleys with metal faces are used, and an unyielding presser plate is employed, great care must be taken in constructing the belt to avoid any thickening at the joint, for such a bump on the belt, traveling, as it does, at quite high speed, often causes the belt to chatter and jump when employed on such a rigid structure. I have found that the rubber faced pulleys, cooperating with a spring backing plate, because of the resilient nature of all the parts, eliminate any tendency of the belt to jump or vibrate, even where the belt joint makes a considerable bump.

The plate 4 is supported by arms 40 and 41 connected one to each end of the backing plate. The upper ends of these arms are preferably interconnected by a spindle 42 to form a hinge.

The plate 4, as has been suggested, I prefer to make of spring steel, so that in passing over surfaces having a slight curvature or provided with a bead upstanding therefrom, it will yield sufficiently to press the abrasive belt into contiguous engagement with the work surface over a large area. It will be noted that the arms 40 and 41 are connected to the plate 4 by hinge connections 43, which, extending for a substantial distance transversely of the plate, prevent any wobbling or tilting thereof as well as keeping the plate directly back of the belt 1 by preventing sidewise movement of the plate. The backing plate is, however, stiff enough to press the abrasive belt against the work for removing slight projections to produce an even surface.

Figure 1:
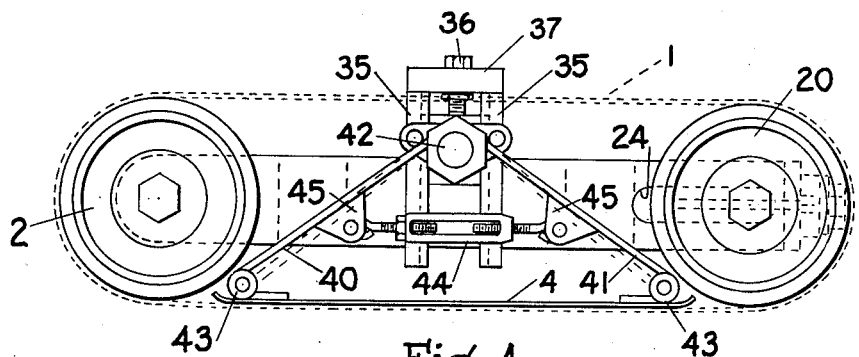
Figure 1 is a side elevation view of my machine.

While the plate 4, in an unflexed position, as shown in Figure 1, will accommodate itself to surfaces which are slightly curved, it will not work satisfactorily in this position to back the abrasive belt for even engagement with a convex surface of relatively small radius. In order that it may back the belt to press evenly on such a surface, such as an automobile fender, for example, means are provided for bowing the plate concavely and for holding it in such a bowed position. Any suitable means to this end may be employed. Figure 5 shows the parts in this position, with the belt in contact with an element such as a fender F. One means which may be employed to bow the plate 4 in this manner is a turnbuckle assembly 44 interconnecting the arms 40 and 41, and including a threaded turnbuckle, and cooperating rods extending in opposite directions, one having a left-hand and the other a right-hand thread. Each rod is secured to its arm by some means such as by a lug 45 attached to the central portion of the arm. If the effective length of the turnbuckle assembly is shortened, the lower ends of the arms 40 and 41 are drawn toward each other, for example to the dotted line positions shown in Figure 1. The plate 4 will, of course, be bowed, and it may either bend outward, as shown in Figure 4, or inward, as shown in Figure 5, depending on whether the operator is going to finish a concave or a convex surface, respectively.

When the plate 4 is bowed outward, pressing against the belt 1, the latter naturally tends to stretch. To maintain the same tension on the belt, therefore, the pulley 20 is carried on a spindle 22 which may be slid in a slot 24 cut in the frame 3. Adjustment of the spindle 22 in either direction may be accomplished by screwing in or out the bolt 23 journaled in a lug 34 formed on the frame 3.

Figure 4:
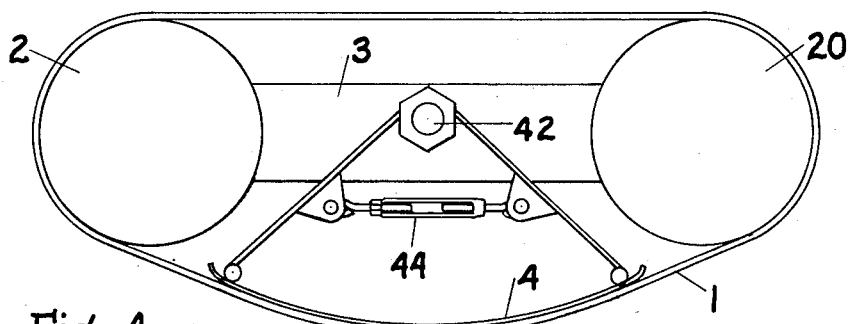
Figures 4 and 5 are somewhat diagrammatic illustrations, showing the parts in various adjusted positions.
Figure 5:
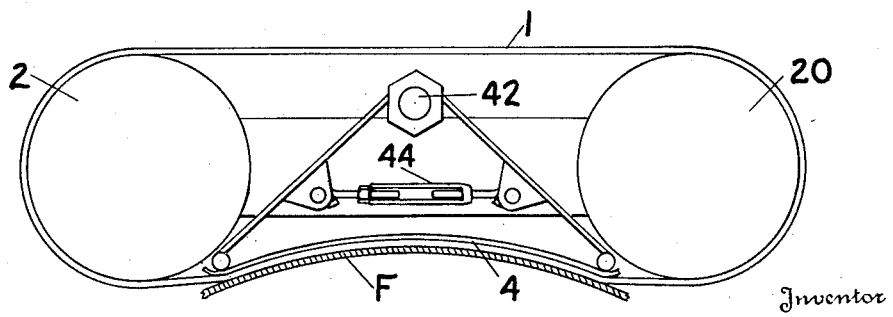

Also, as will be evident from Figure 4, as the plate 4 is bowed outward the belt 1 would tend to contact the plate only at the center thereof. Since it is desirable to have the plate 4 back the belt over the entire plate surface I provide mechanism for advancing the plate toward the belt into a position wherein the ends of the plate 4 will be substantially tangential to the pulleys 2 and 20 at the extreme point of contact of the belt 1 therewith. Such mechanism I have shown as including a T head 46, secured on the spindle 42 and sliding in guides 35 fixed to the frame 3. To move the T head 46 in the guideway to advance the plate 4 toward or to retract it from the abrasive belt I prefer to provide a bolt 36 journaled in a cross piece 37 mounted on the guides 35 and screwed into the T head 46. By such means the plate and its supporting means can be advanced toward the belt when the plate 4 is bowed outwardly, as shown in Figure 4, and can be retracted from the belt when the plate 4 is bowed inwardly or concavely, as shown in Figure 5.

In order to prevent excessive lengthening of the turnbuckle assembly, and to prevent excessive movement of either arm 40 or arm 41 with respect to the spindle 42, whereby an end of the plate 4 might dig into one of the rubber faced pulleys, stop pins 47 are employed, projecting over the plates 40 and 41 to limit upward movement thereof. These pins are carried by a member 48 secured to the spindle 42 by any suitable means such as an interconnecting pin.

To facilitate adjustment of the various parts, even when the machine is running, I may provide a portion such as a hexagon head on the turnbuckle 44 to be engaged by a wrench. Thus the amount which the plate 4 is bowed, the advancement or retraction of the plate from the belt, and the adjustment of the spindle 22 of the pulley 20, by moving screw 23, to obtain the proper belt tension, may all be accomplished by means of a wrench. When the parts are in the desired position they may be clamped therein by tightening the nut 38 to hold the T head in a definite position in its guides and tightening the nut 49 to press together the hinged ends of the arms 40 and 41 to lock them against relative movement. Thus all the parts may be clamped in a desired adjusted position, or the several holding members can be left slightly slackened to permit ready adjustment, according to various conditions encountered.

Despite the mechanism provided to accomplish these various adjustments, it will be noted that my device is very simple, all the parts being supported from the single frame member 3. Thus the outer sides of the pulleys 2 and 20, as well as the backing plate assembly, are left free and unobstructed for removal and replacement of the abrasive belt and for ready adjustment of the several parts. In addition the pulleys and the belt 1 carried thereby are preferably spaced from the frame 3 as shown, so that the operator may obtain a clear view of the work being operated on, between the frame and the belt.

What I claim as my invention is:

1. A manually portable machine for resurfacing curved portions of sheet metal structures, comprising a frame, spaced pulleys supported therefrom, an abrasive belt looped about said pulleys, a flexible backing plate directly engaging said belt between the pulleys, and means supporting said backing plate from said frame, and adjustable to bow said plate either concavely or convexly and to hold said plate in either of such bowed attitudes.

2. A machine of the type described, comprising a frame, spaced pulleys supported therefrom, an abrasive belt looped about said pulleys, a resilient backing plate engaging said belt between the pulleys, means supporting said backing plate from said frame, and adjustable to bow said resilient plate, and means to adjust the backing plate bodily transversely with respect to a plane common to the axes of the two pulleys.

3. A machine of the type described, comprising a frame, spaced pulleys supported therefrom, an abrasive belt looped about said pulleys, a resilient plate, two supporting arms connected, each by one end thereof, to opposite ends of said plate, the other ends of said arms being supported from the frame, and means to draw their plate connected ends toward each other to bow said resilient plate, forming a curved backing for the belt.

4. A machine of the type described, comprising a frame, spaced pulleys supported therefrom, an abrasive belt looped about said pulleys, a resilient plate, two supporting arms connected, each by one end thereof, to opposite ends of said plate, the other ends of said arms being supported from the frame, and means adjustable in effective length interconnecting said two arms between their ends to draw their plate connected ends toward each other to bow said resilient plate, forming a curved backing for the belt.

5. A machine of the type described, comprising a frame, spaced pulleys supported therefrom, an abrasive belt looped about said pulleys, a flexible plate, two supporting arms relatively angularly displaceable to vary the flexure of said plate, pivot means connecting said arms, each by one end thereof, to opposite ends of said plate, a member supporting the other ends of said arms, and guide means mounted on said frame, guiding said supporting member for movement to advance said two supporting arms simultaneously, with the resilient plate, toward or to retract them from said belt.

6. The combination of claim 5, and a tension member having an end secured to each of the arms between the ends thereof, and adjustable in effective length to bow the plate convexly when the supporting member is moved to advance the plate toward the belt and to bow the plate concavely when the supporting member is moved to retract the plate away from the belt.

7. A machine of the type described, comprising a frame, spaced pulleys supported therefrom, an abrasive belt looped about said pulleys, a resilient plate, two arms connected, each by one end thereof, to opposite ends of said plate, a member supporting the other ends of said arms for relative angular movement, to flex said plate, and stop means carried by said supporting member to limit movement of each arm with respect to said supporting member.

8. A machine of the type described, comprising a frame, spaced pulleys supported therefrom, an abrasive belt looped about said pulleys, a resilient plate, two arms connected, each by one end thereof, to opposite ends of said plate, a spindle hingedly connecting the opposite ends of said arms, a member fixed on said spindle and provided with pins extending over said arms to limit relative movement thereof and movement of each with respect to said spindle, and means supporting said spindle from said frame.

9. The combination of claim 8, and means to hold said two arms in fixed relation to each other.

10. The combination of claim 8, in which the supporting means includes spaced guide members secured to the frame and a T head on said spindle received between said guide members for adjustment with respect to the frame.

11. A machine of the type described, comprising a frame, spaced pulleys supported therefrom, an abrasive belt looped about said pulleys, a flexible backing plate supported from said frame, disposed lengthwise between said pulleys, engageable with said belt and bendable to conform to the curvature of work operated upon, and means to effect relative displacement of said pulleys and plate corresponding to the flexure of the latter, to dispose the ends of said plate substantially tangential to their adjacent pulley faces for various flexures of said plate.

12. A machine for resurfacing curved portions of sheet metal structures, comprising a frame, spaced pulleys supported therefrom, an abrasive belt looped about said pulleys, a flexible backing plate contiguously engageable with said belt between the pulleys, and bendable concavely or convexly to conform to the curvature of work operated upon, and means supporting said backing plate from said frame, and adjustable to align the plate according to its curvature tangentially with the pulleys, to move the plate bodily normally with respect to a plane including the axes of said pulleys, and to hold it positively fixed in a desired assumed position.

ANDERS THOMPSON.